Figure 1:
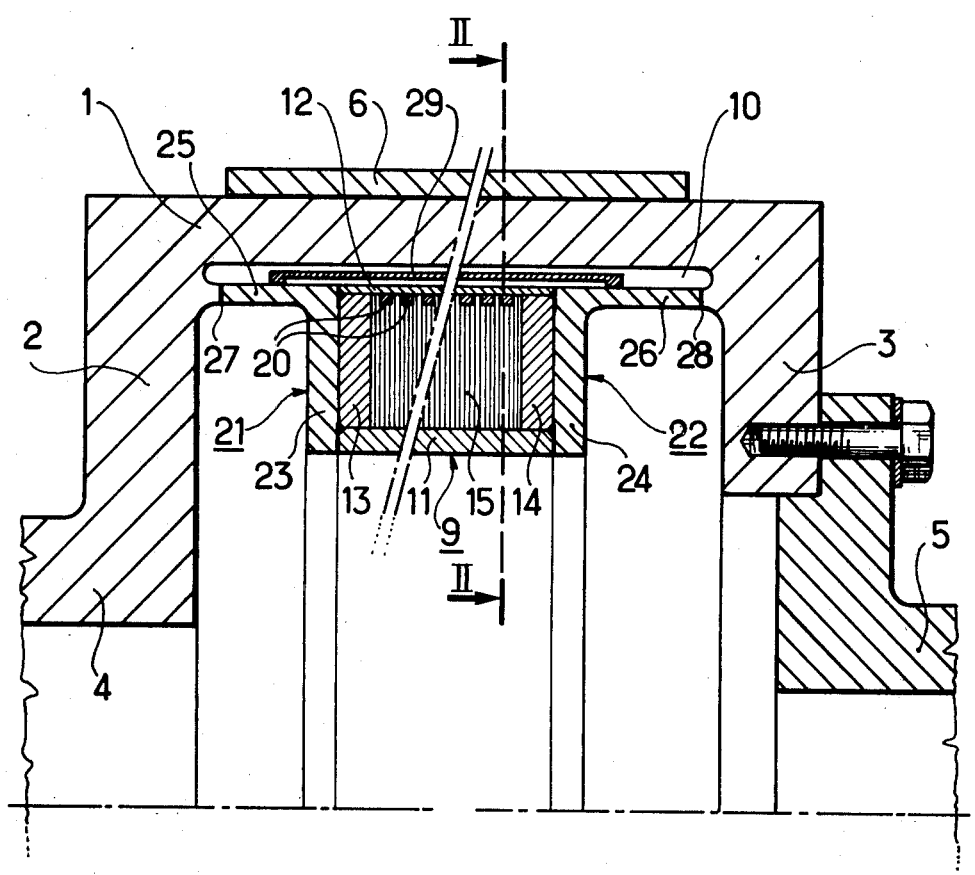

United States Patent [19]

Gillet

[11] 4,016,444
[45] Apr. 5, 1977

[54] ROTOR FOR AN ELECTRIC MACHINE HAVING A CRYO-INDUCTOR

[75] Inventor: Roger Gillet, Belfort, France

[73] Assignees: Societe Generale de Constructions Electriques et Mecaniques (ALSTHOM), Paris Cedex; Electricite de France (Service National), Paris, both of France

[22] Filed: Apr. 15, 1975

[21] Appl. No.: 568,239

[30] Foreign Application Priority Data

Apr. 17, 1974 France .................. 74.13313

[52] U.S. Cl. .................. 310/261; 310/52
[51] Int. Cl.² .................. H02K 1/22
[58] Field of Search .......... 310/10, 264, 40, 265, 310/52, 54, 43, 165, 194, 198, 201, 205, 261; 336/210, 211, 212, 213, 216, 219, 233, 234

[56] References Cited

FOREIGN PATENTS OR APPLICATIONS 2,232,806  1/1974  Germany .................. 310/40

Primary Examiner—R. Skudy
Attorney, Agent, or Firm—Sughrue, Rothwell, Mion, Zinn & Macpeak

[57] ABSTRACT

The invention concerns electric rotating machines whose rotor inductor operates at a very low temperature, characterized in that the rotor of these machines comprises a bearer cylinder made of a non-magnetic material inside which a closed cylindrical body for supporting the inductor winding is fixed in a fluid-tight manner so as to form, between the bearer cylinder and the closed cylindrical body, a space subjected to a thorough vacuum. The invention applies more particularly to electric generators with an inductor cooled by liquid helium.

4 Claims, 2 Drawing Figures

ROTOR FOR AN ELECTRIC MACHINE HAVING A CRYO-INDUCTOR

The invention concerns electric rotating machines whose inductor, borne by the rotor, operates at a very low temperature, for example that of liquid helium, of liquid hydrogen or of liquid nitrogen.

It is known that the dissipating of heat at very low temperature is very expensive and that it is the greatest advantage to reduce as much as possible the size of the elements which are to be kept at that temperature. Rotors of electric rotating machines comprising a bearer cylinder made of a non-magnetic material, constituting a mechanically bearing structure for the rotor and arranged between two portions of shaft and a cylindrical body which supports an inductor winding cooled at a very low temperature, that cylindrical body having an outside diameter smaller than the inside diameter of the said bearer cylinder, being placed coaxially inside the latter and being fixed at its axial ends in a fluid-tight manner on the rotor, so as to form, between the said bearer cylinder and the said closed cylindrical body, an enclosed space which can be subjected to a vacuum have already been proposed for that purpose.

The bearer cylinder is at a non-cryogenic temperature and the volume of the elements at cryogenic temperature is reduced considerably. The magnetic substance constituting the bearer cylinder can be, for example, a non-magnetic steel or a titanium alloy, but it could be also an insulating material having a sufficient mechanical strength to bear the efforts to which the rotor is subjected.

The cylindrical winding bearer body can be a solid, metallic or insulating body, in which grooves have been provided for accommodating the inductor winding, for example according to U.S. Pat. No. 3,821,568 of June 26, 1974. It has been found, according to the present invention, that it was possible to conciliate great mechanical rigidity and slight losses in regulating periods or short-circuit periods, by adopting a mixed structure of the said cylindrical body which is then formed by a closed metallic box filled with insulating materials in which hollowed out parts are provided to accommodate the inductor winding.

The metallic box is preferably constituted by a metal having high resistivity such as a titanium alloy, a stainless steel or a steel having a high nickel content. It can, more particularly, be constituted by two coaxial tubes whose intermediate space is closed by two plates fixed to the axial ends of these tubes.

On referring to the accompanying diagrammatic figures, an example of embodiment of the invention, enabling other characteristics of the latter to become apparent and having no limiting character, will be described.

Figure 2:
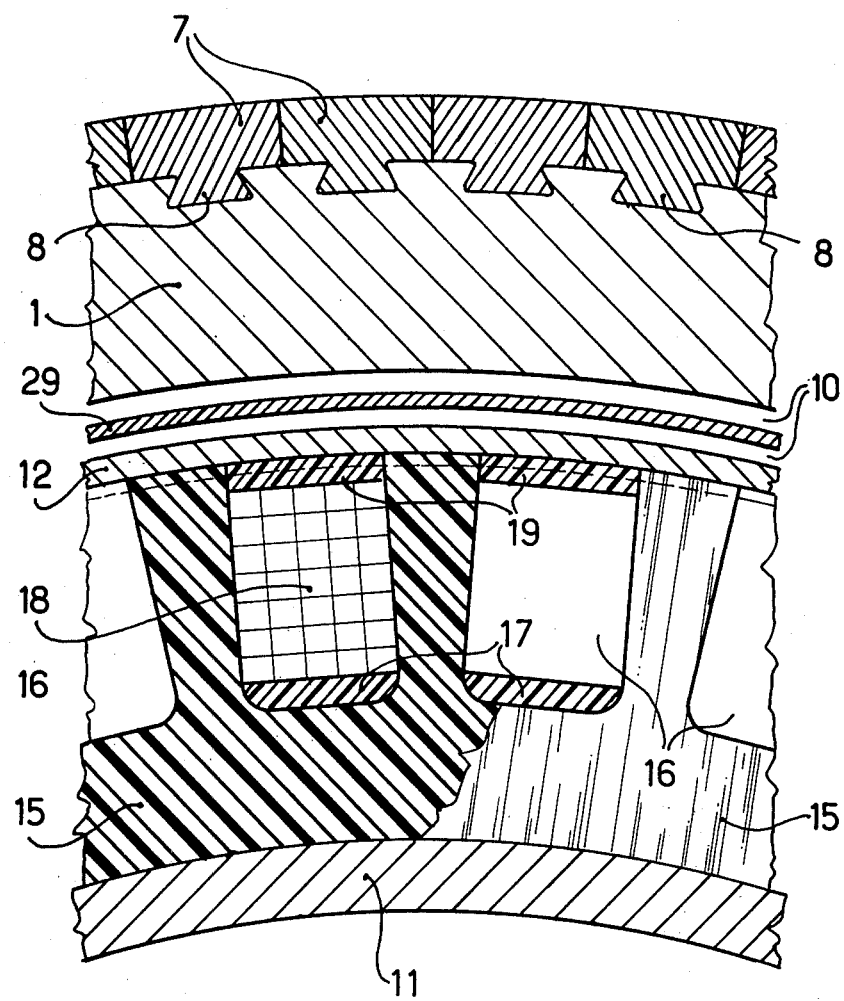

FIG. 1 is an axial cutaway view of a portion of rotor of an electric generator and FIG. 2 is, on a larger scale, a partial transversal cross-section view of that rotor through the line 2—2 in FIG. 1.

The rotor according to FIG. 1 comprises an outside bearing cylinder 1 connected at its ends by radial portions 2 and 3 to portions of shaft 4 and 5. The cylinder 1 is made of non-magnetic steel and is sufficiently thick to withstand the efforts to which the rotor is subjected. It fulfills simultaneously the function of an electromagnetic screen and of a mechanical bearer structure. The cylinder 1 is at the ambient temperature or, at least, at a non-cryogenic temperature. It is provided at its periphery with a shock absorber 6 constituted, as can be seen in FIG. 2, by a set of bars 7, made of copper for example, fixed in the cylinder 1 by dovetail tenons 8.

The inductor support, designated as a whole by the reference numeral 9, forms a closed cylindrical body fixed on the rotor, leaving, between that cylindrical body and the cylinder 1, a space 10 subjected to a thorough vacuum.

The inductor support structure comprises a metallic casing, made of titanium alloy, for example, formed by an inside tube 11, an outside tube 12 and end plates 13 and 14 welded onto those tubes. The inside of the casing is filled with an insulating material 15.

The filling of the box formed by the metallic casing 11, 12, 13, 14 with insulating material can be effected by rolling an insulating strip constituted by mechanically resistant fibres such as glass fibres and synthetic resin, on the tube 11 until the required thickness is obtained. It is preferred to stack insulating disks on one another in the axial direction. These disks can, more particularly, be made of a stratified substance consisting of mechanically resistant fibres such as glass fibres and synthetic resin such as an epoxyd resin. The disks must have characteristics which are just about homogeneous in the radial direction, to avoid differential voltages or irregular deformations when the inductor winding is cooled. For that purpose, when the disks are produced by cutting out from a stratified insulant, arrangements are made for installing them with angular shifts which are different from one another if the position they took up in the stratified insulant before the cutting out which separated them from the latter is taken as the reference position. These disks are installed and keyed onto the tube 11, then they are clamped by the two end plates 13 and 14.

The machining of notches 16, visible in FIG. 2, intended for accommodating, on a wedge 17 in the bottom of the notches, an assembly 18, not shown in detail, comprising an inductor winding and passages for a cryogenic cooling fluid for that inductor, can then be effected. After the installing of the inductor winding and of the cooling passages, the notches 16 are closed by wedges 19. Bands 20 which are visible in FIG. 1, constituted, for example, by the winding of a strip of glass fibres and synthetic resin, are installed at intervals in previously machined grooves, then the radially external surface of the insulating material 15 and of the bands 20 are machined with a lathe, then the tube 12 can be tight fitted and the assembly can be closed by welding the two tubes 11 and 12 to the end plates 13, 14, this making it possible to produce a box 9 which is fluid-tight to the cryogenic fluid with a minimum of metallic substances and a minimum of welds.

The mechanical connection between the box 9 and the rotor which should bear it is effected by means of two parts of revolution 21, 22, a half cross-section of which is seen in FIG. 1 in the shape of an angle part one of whose branches (23, 24) perpendicular to the axis of the rotor is applied against an axial end of the box 9 and fixed on the latter by welding or mechanical assembling, whereas the other branch (25, 26) parallel to the axis of the rotor is fixed on the rotor at its end (27, 28) by welding.

A cylindrical intermediate thermal screen 29 fixed at its axial ends on the parts of revolution 21 and 22 can be inserted in the space 10.

The electrical connections between the inductor winding and the outside, as well as the cryogenic fluid inlet and outlet pipes, are placed at the axial ends of the inductor support 9. They have not been shown and also the configuration of the inductor winding and of the cryogenic fluid passages in the notches 16 has not been shown, for these are arrangements which do not form a part of the invention and which can be brought into service according to the present state of the art.

I claim:

1. A rotor for an electric rotating machine comprising: a bearer cylinder made of non-magnetic material and constituting the mechanical bearer structure for the rotor, the cylinder being disposed between two portions of the rotor shaft; and a cylindrical body for supporting the rotor inductor winding and having an outside diameter less than the inside diameter of the bearer cylinder, the cylindrical body being disposed coaxially inside the bearer cylinder and being fixed at its axial ends to the bearer cylinder in a fluid-tight manner to form between the bearer cylinder and the cylindrical body an enclosed space for holding a vacuum; and characterized in that: the cylindrical body is a closed annular metallic box; insulating materials fill said annular box and have a plurality of recesses spaced along the outer periphery thereof for accommodating said inductor winding; said recesses extending radially inwardly into said box from the outer periphery thereof for a distance less than the radial thickness of the annulus formed by said box; and said rotor comprises two parts of revolution, each of whose axes of revolution coincides with the axis of the rotor, and each having a half cross-section in the shape of an angle part, a first of whose branches perpendicular to the axis of revolution is applied against and secured to an adjacent axial end of said closed metallic box, whereas the second branch parallel to the axis of revolution is fixed on the rotor by its end.

2. Rotor according to claim 1, characterized in that said metallic box comprises two coaxial tubes of different diameters and two end plates fixed to the axial ends of said tubes to form said annular box.

3. Rotor according to claim 1, characterized in that said insulating materials are stratified products consisting of mechanically resistant fibres and a synthetic resin.

4. Rotor according to claim 3, characterized in that the said insulating materials are insulating disks stacked on one another in the axial direction.

* * * * *